(12) United States Patent
Casini

(10) Patent No.: US 10,766,520 B2
(45) Date of Patent: Sep. 8, 2020

(54) STEERING COLUMN

(71) Applicant: MMX—MECCANOPLAST S.R.L., Reggio Emilia (IT)

(72) Inventor: Massimiliano Casini, Reggio Emilia (IT)

(73) Assignee: MMX—MECCANOPLAST S.R.L., Reggio Emilia (IT)

( * ) Notice: Subject to any disclaimer, the term of this patent is extended or adjusted under 35 U.S.C. 154(b) by 72 days.

(21) Appl. No.: 16/091,626

(22) PCT Filed: Apr. 4, 2017

(86) PCT No.: PCT/IB2017/051901
§ 371 (c)(1),
(2) Date: Oct. 5, 2018

(87) PCT Pub. No.: WO2017/175118
PCT Pub. Date: Oct. 12, 2017

(65) Prior Publication Data
US 2019/0152509 A1    May 23, 2019

(30) Foreign Application Priority Data

Apr. 8, 2016   (IT) ................... 102016000036484

(51) Int. Cl.
| | |
|---|---|
| *B62D 1/187* | (2006.01) |
| *B62D 1/183* | (2006.01) |
| *B62D 1/184* | (2006.01) |
| *F16C 1/10* | (2006.01) |

(52) U.S. Cl.
CPC ............ *B62D 1/187* (2013.01); *B62D 1/183* (2013.01); *B62D 1/184* (2013.01); *F16C 1/10* (2013.01)

(58) Field of Classification Search
CPC ........ B62D 1/187; B62D 1/184; B62D 1/183; F16C 1/10
See application file for complete search history.

(56) References Cited

U.S. PATENT DOCUMENTS

| | | | | |
|---|---|---|---|---|
| 3,548,675 A | * | 12/1970 | Grimes ................. | B62D 1/183 74/493 |
| 3,628,396 A | * | 12/1971 | Grobowski ............ | B62D 1/184 74/493 |

(Continued)

FOREIGN PATENT DOCUMENTS

| | | |
|---|---|---|
| IT | BO20140490 A1 | 3/2016 |
| WO | 2017077472 A1 | 5/2017 |

*Primary Examiner* — Drew J Brown
(74) *Attorney, Agent, or Firm* — Pearne & Gordon LLP

(57) ABSTRACT

A steering column (10), comprising: —a base (20); —a lower section (25), hinged to the base (20); —an intermediate section (30), hinged to the lower section (25); —an actuation lever (60) operable between a locked position, in which the actuation lever (60) is in stable equilibrium and constrains the mutual rotation of the lower section (25) relative to the base (20) and the mutual rotation of the intermediate section (30) relative to the lower section (25), and a first unlocked position or a second unlocked position, distinct from each other, in each of which it respectively releases one of the mutual rotation of the lower section (25) relative to the base (20) and the mutual rotation of the intermediate section (30) relative to the lower section (25).

10 Claims, 11 Drawing Sheets

(56) References Cited

U.S. PATENT DOCUMENTS

| | | | | |
|---|---|---|---|---|
| 4,774,851 A | * | 10/1988 | Iwanami | B62D 1/184 74/493 |
| 5,035,446 A | * | 7/1991 | Arvidsson | B62D 1/181 280/775 |
| 5,105,677 A | * | 4/1992 | Hoblingre | B62D 1/181 280/775 |
| 5,178,411 A | * | 1/1993 | Fevre | B62D 1/181 280/775 |
| 5,265,492 A | * | 11/1993 | Snell | B62D 1/184 280/775 |
| 5,439,252 A | | 8/1995 | Oxley et al. | |
| 5,613,404 A | * | 3/1997 | Lykken | B62D 1/184 280/775 |
| 7,469,616 B2 | * | 12/2008 | Fujiu | B62D 1/184 74/493 |
| 2008/0150270 A1 | | 6/2008 | Longo | |
| 2018/0319421 A1 | * | 11/2018 | Casini | B62D 1/189 |

* cited by examiner

STEERING COLUMN

TECHNICAL FIELD

The present invention relates to a steering column for vehicles, for example for heavy-duty and/or agricultural vehicles.

BACKGROUND ART

There are known steering columns comprising a fixed base to which an upper section is connected from the upper end of which a top portion of a steering axle associated to a steering wheel protrudes.

The upper section, for example, can be associated in a movable manner relative to the base with respect to at least two degrees of freedom, for example one rotational and one translational, for the regulation of the steering wheel tilting and height, respectively.

Such steering columns of known type may have one or more control members, individually operable between a locked position, in which they constrain both degrees of freedom of the upper section relative to the base, and respective unlocked positions, in which they release one or both degrees of freedom of the upper section relative to the base.

For example, the simultaneous adjustment of the steering wheel is allowed in both functions (tilting and rotation) via a single control member which, once actuated, unlocks both movements or separate adjustment of both movements respectively with distinct control members, for example two levers, a lever and a pedal, a lever and a button, or even the separate adjustment of both movements with a single control member using different movements of the control member itself.

In addition, there are steering columns equipped with two rotational joints, one at the base and the other at the centreline, with respect to the longitudinal axis of the steering column.

In such steering columns, the number of control members that control the locking and unlocking of the joint increases and, for example, there is one for the upper joint (e.g. a lever or a button), and one for the lower joint (typically a pedal).

An object of the present invention is to make available a convenient and simple steering column to be adapted to the needs of the driver, in the context of a simple, rational and cost-effective solution.

Such objects are achieved by the features of the invention reported in the independent claim. The dependent claims describe preferred and/or particularly advantageous aspects of the invention.

DISCLOSURE OF THE INVENTION

Particularly, the invention provides a steering column comprising:
 a base;
 a lower section, hinged to the base;
 an intermediate section, hinged to the lower section;
 an actuation lever operable between a locked position, in which the actuation lever is in stable equilibrium and constrains the mutual rotation of the lower portion relative to the base and the mutual rotation of the intermediate section relative to the lower section, and a first unlocked position or a second unlocked position, distinct from each other, in each of which it respectively releases one of the mutual rotation of the lower section relative to the base and the mutual rotation of the intermediate section relative to the lower section.

Thanks to this solution, the driver can easily operate the actuation lever, bring it in the desired unlocked position and then operate the steering wheel and orient it for adjusting the same in a comfortable, quick and safe manner.

Advantageously, in the first unlocked position and in the second unlocked position, the actuation lever can be located in two distinct respective stable equilibrium positions.

Thanks to this, the driver can release the lever while it can steer the steering wheel with both hands, therefore operating in a safe and effective manner.

Advantageously, the steering column may comprise an upper section slidably connected to the intermediate section.

Thanks to this solution, the steering wheel can also be easily adjusted in height to all inclinations permitted by the two hinges.

Still, according to this embodiment, the actuation lever to the locked position can be adapted to block the mutual translational motion between the upper section and the intermediate section and be operable between the locked position and a further unlocked position, distinct from the first unlocked position and the second unlocked position, in which it frees the mutual translational motion of the upper section with respect to the intermediate section.

Thanks to this solution, the locking and unlocking of the sliding of the upper section relative to the intermediate section is particularly simple, convenient and intuitive for the driver.

Advantageously, in the further unlocked position, the actuation lever can be located in a stable equilibrium position.

Again, between the upper section and the intermediate section a frictional locking assembly can be interposed, equipped with a control member selectively operable between a closed position, in which it stops the sliding of the upper section with respect to the intermediate section, and an open position, in which it releases the sliding of the upper section relative to the intermediate section;
and the actuation lever can be connected to the control member for the actuation of the same selectively between the closed position and the open position, respectively in the locked position of the actuation lever and in the further unlocked position of the same.

In this way, it is possible to realize the stable equilibrium configurations in the locked position of the actuation lever in a simple, safe and effective manner.

Advantageously, the operating lever may be rotatably connected relative to the upper section with respect to a first axis of oscillation and comprise a cam with an eccentric profile relative to the first axis of oscillation and adapted to actuate the control member selectively between the closed position and the open position as a result of an oscillation of the cam with respect to the first axis of oscillation of a given angle of oscillation.

Again, between the lower section and the base, a first gas spring can be interposed, comprising:
 a first cylinder, hinged to the base or to the lower section;
 a first stem slidably connected to the cylinder and hinged to the other of the
lower section and the base; and
 a first control element selectively operable between a stop position, in which it stops the sliding of the first stem relative to the first cylinder, and an unlocked position, in which it releases the sliding of the first stem relative to the first cylinder;

and the actuation lever can be connected to the first control element for the actuation of the same selectively between the locked position and the unlocked position, respectively in the locked position of the actuation lever and in the first unlocked position of the same.

Moreover, the actuation lever may be rotatably connected to the upper section with respect to a second axis of oscillation and comprises at least an eccentric portion, i.e. eccentric with respect to the second axis of oscillation, to which the first control member is connected by a first traction cable, for the actuation of the first control member selectively between the stop position and the unlocked position as a result of an oscillation of the eccentric section with respect to the second axis of oscillation of a given angle of oscillation.

According to a further aspect of the invention, a second gas spring can be interposed between the intermediate section and the lower section, comprising:
- a second cylinder, hinged to the lower section or to the intermediate section;
- a second stem slidably connected to the second cylinder and hinged to the other of the intermediate section and the lower section; and
- a second control element selectively operable between a stop position, in which it stops the sliding of the second stem relative to the second cylinder, and an unlocked position, in which it releases the sliding of the second stem relative to the second cylinder;

and that the actuation lever can be connected to the second control element for the actuation of the same selectively between the locked position and the unlocked position, respectively in the locked position of the actuation lever and in the second unlocked position of the same. Advantageously, the actuation lever may be rotatably connected to the upper section with respect to a second axis of oscillation and comprise at least an eccentric portion, i.e. eccentric with respect to the second axis of oscillation to which the second control member is connected by a second traction cable, for the actuation of the second control member selectively between the stop position and the unlocked position as a result of an oscillation of the eccentric section with respect to the second axis of oscillation of a given angle of oscillation.

BRIEF DESCRIPTION OF DRAWINGS

Further features and advantages of the invention will become apparent from reading of the following description provided by way of example and not of limitation, with the help of the figures illustrated in the attached tables.

BEST MODE FOR CARRYING OUT THE INVENTION

Figure 1:
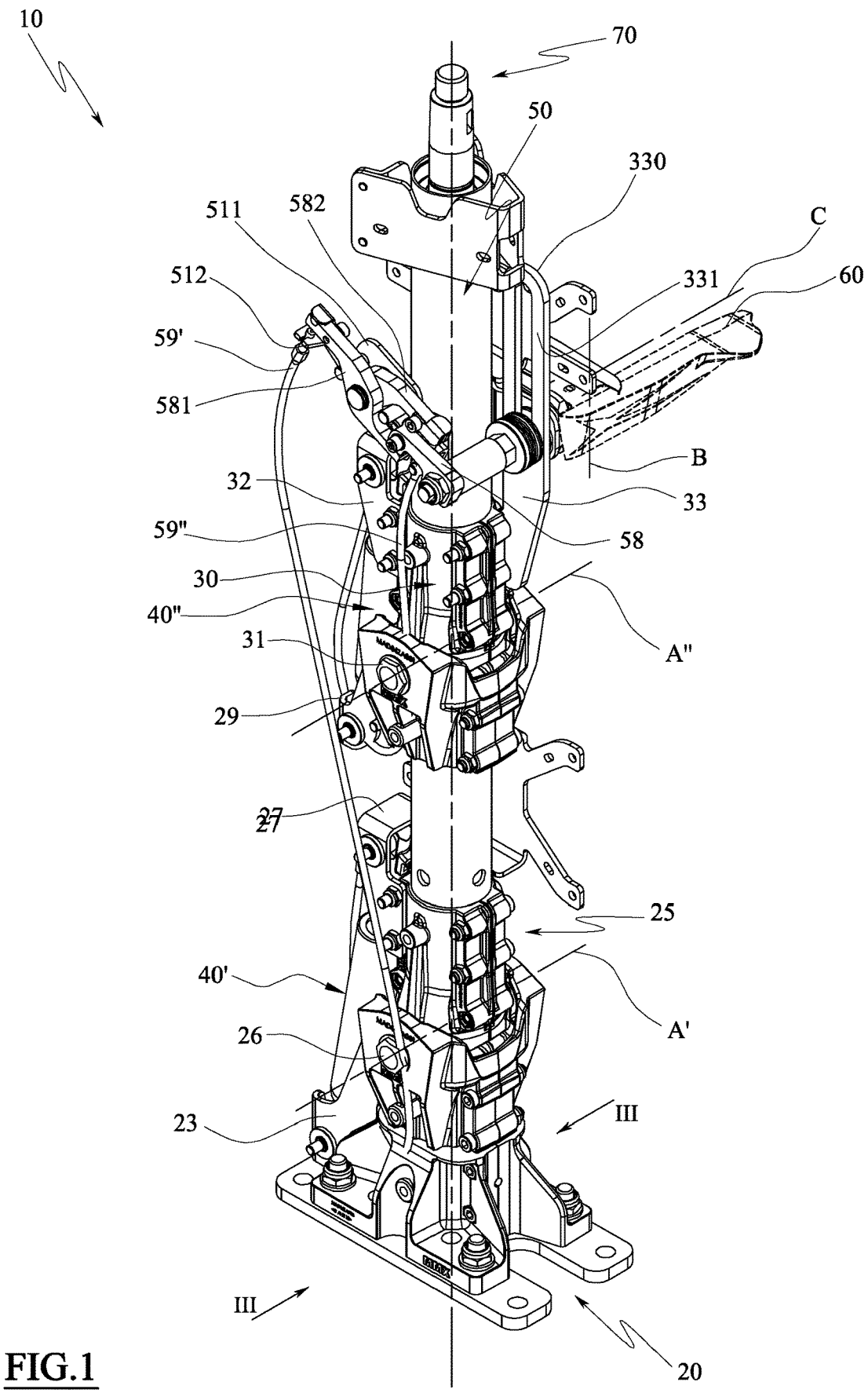
FIG. 1 is a front-side axonometric view of a steering column according to the invention.
Figure 2:
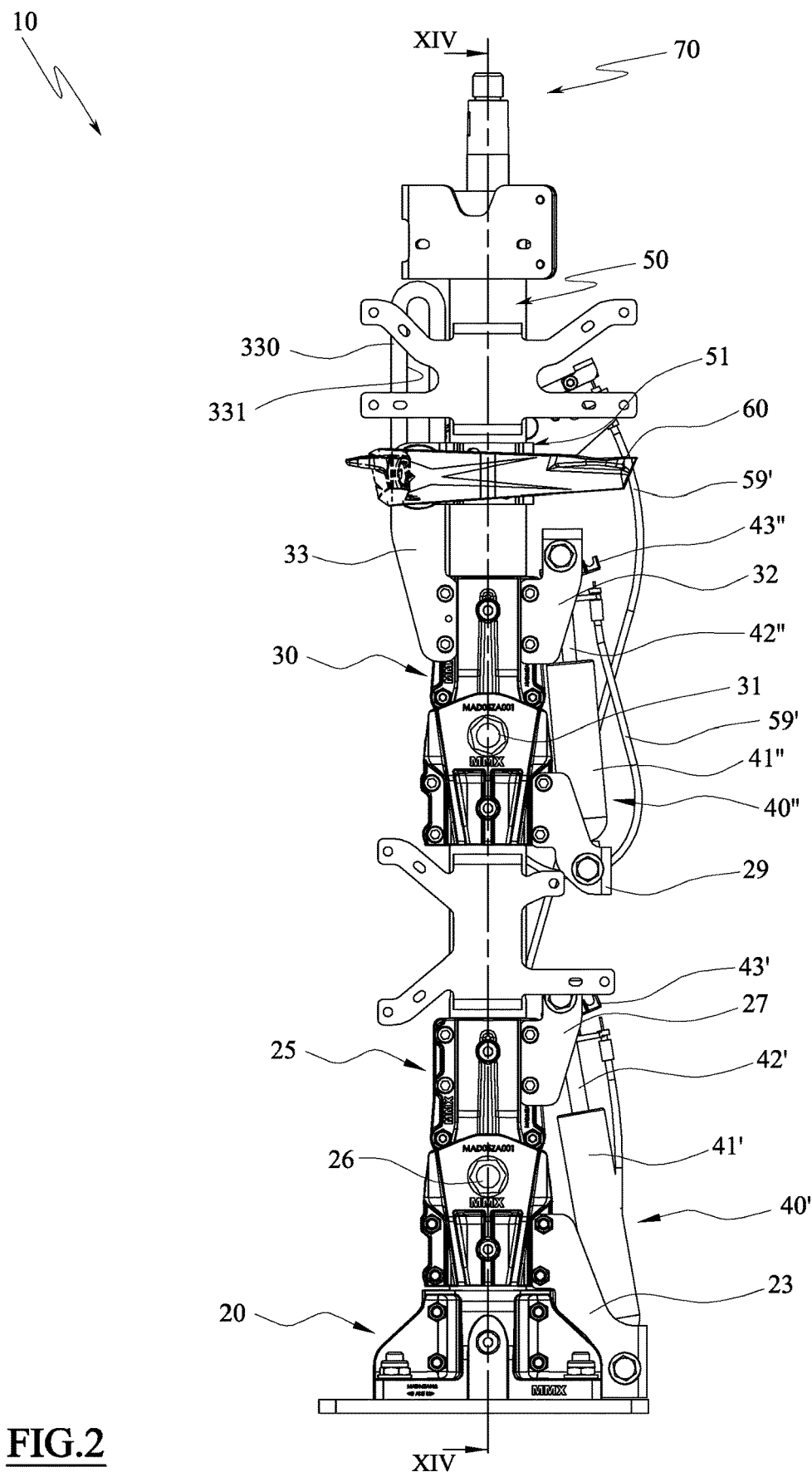
FIG. 2 is a side view from II of FIG. 1.
Figure 3:
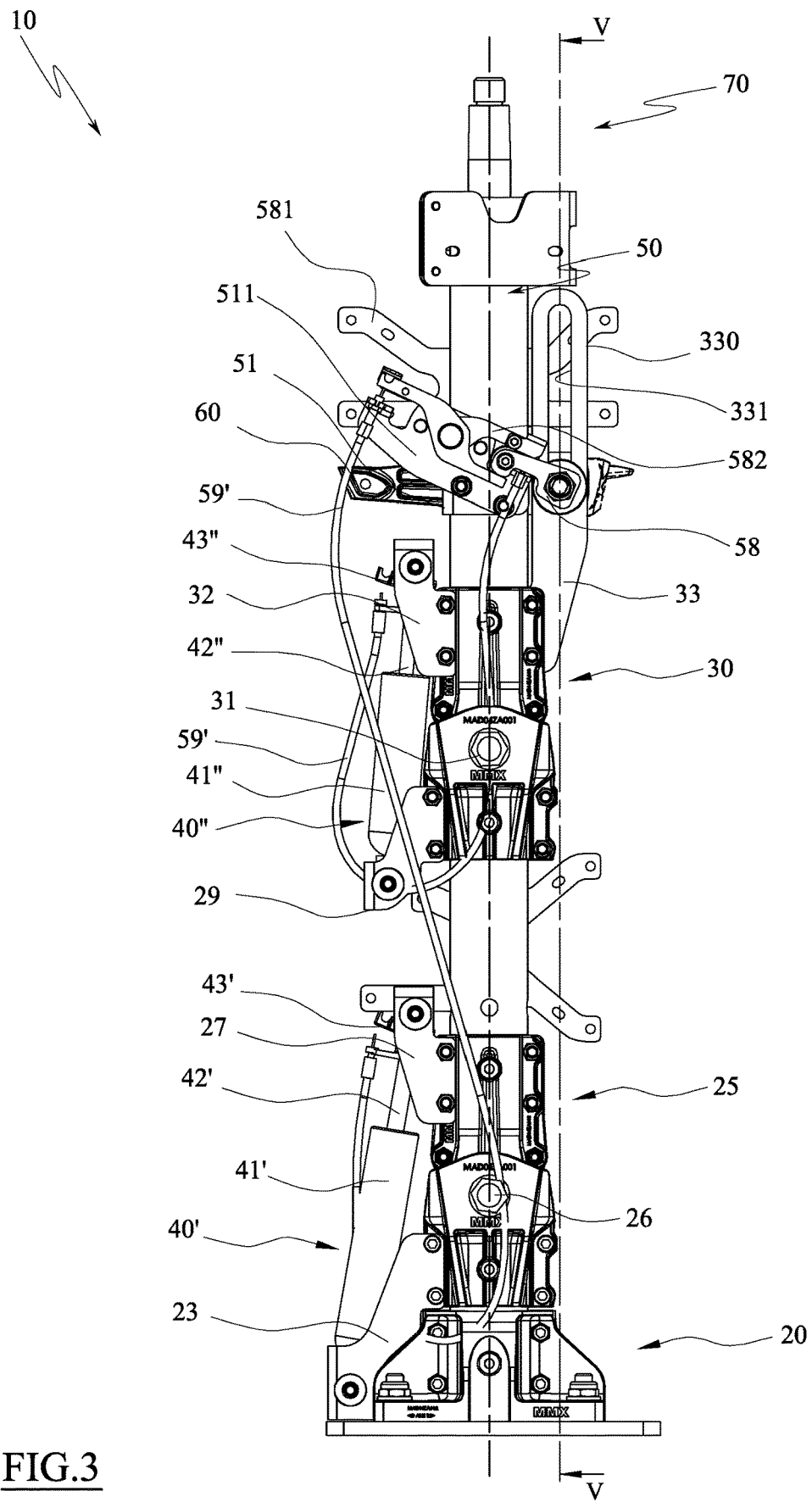
FIG. 3 is a side view from III of FIG. 1.
Figure 4:
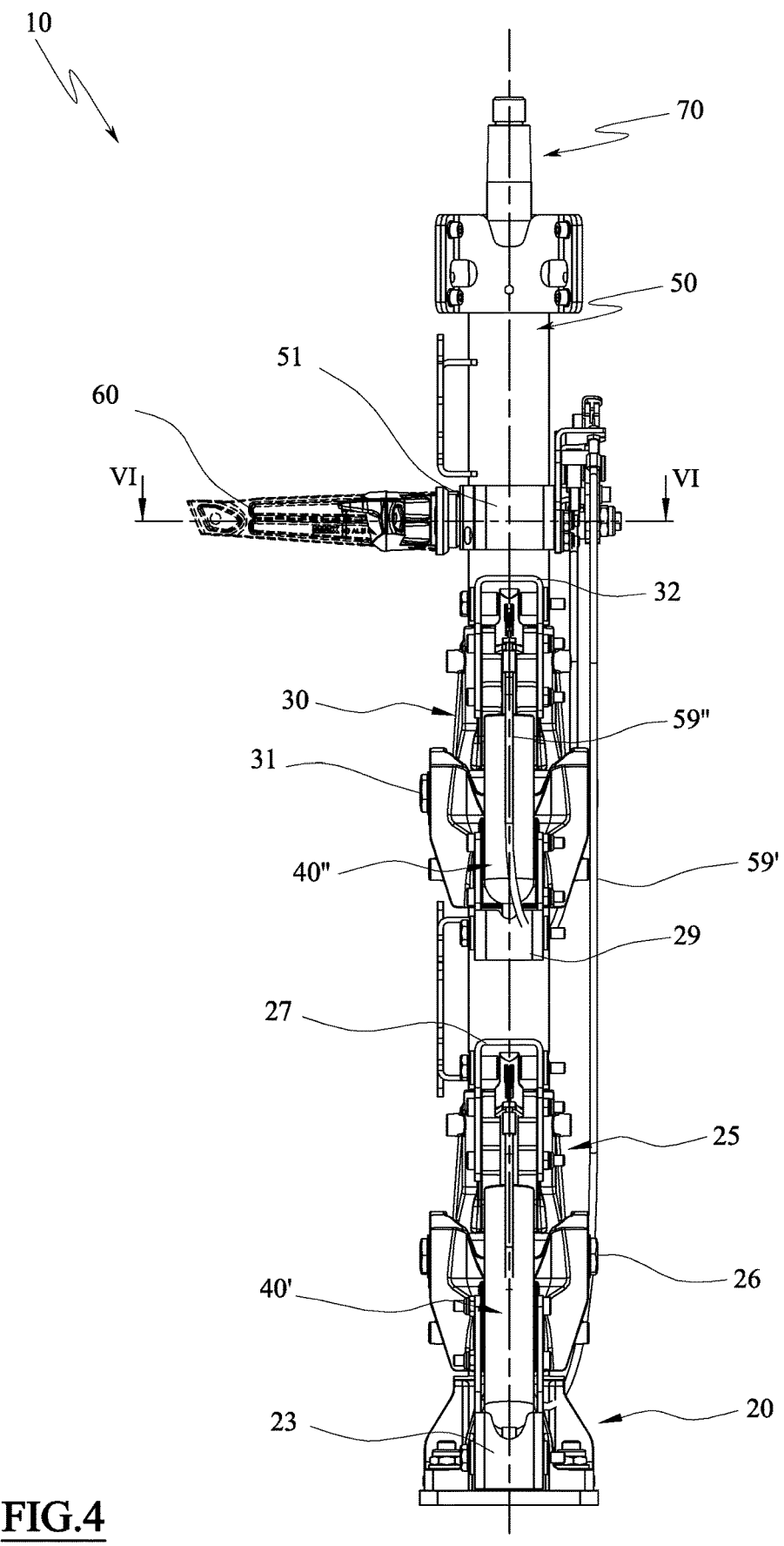
FIG. 4 is a front view of FIG. 1.
Figure 5:
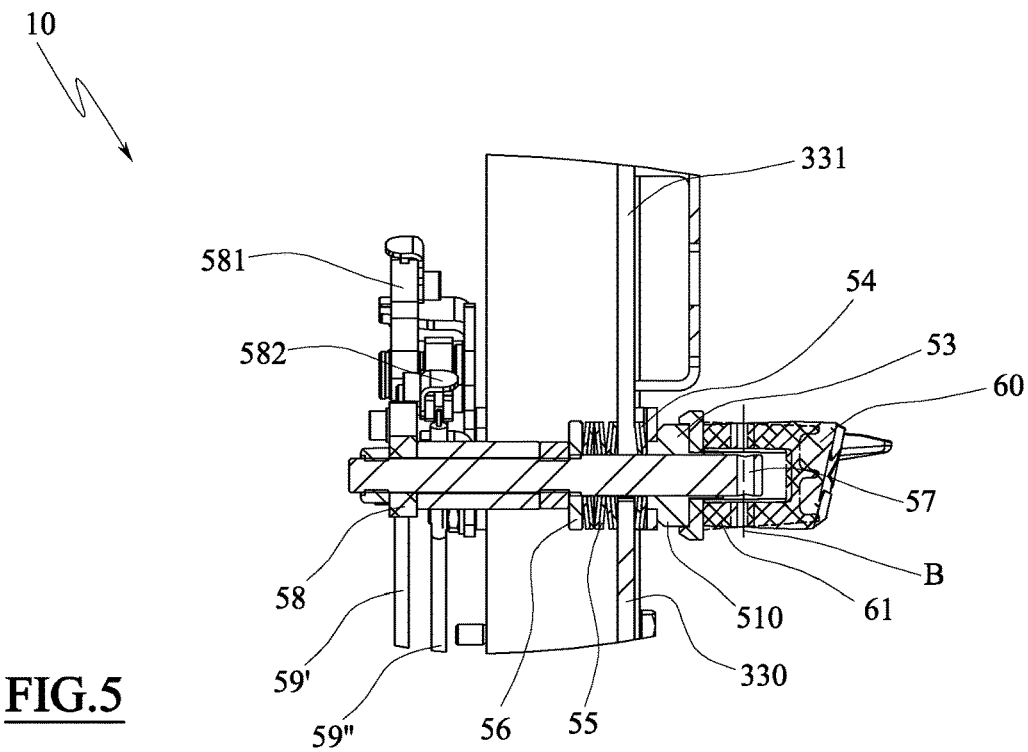
FIG. 5 is a sectional view taken along section line V-V of FIG. 3.
Figure 6:
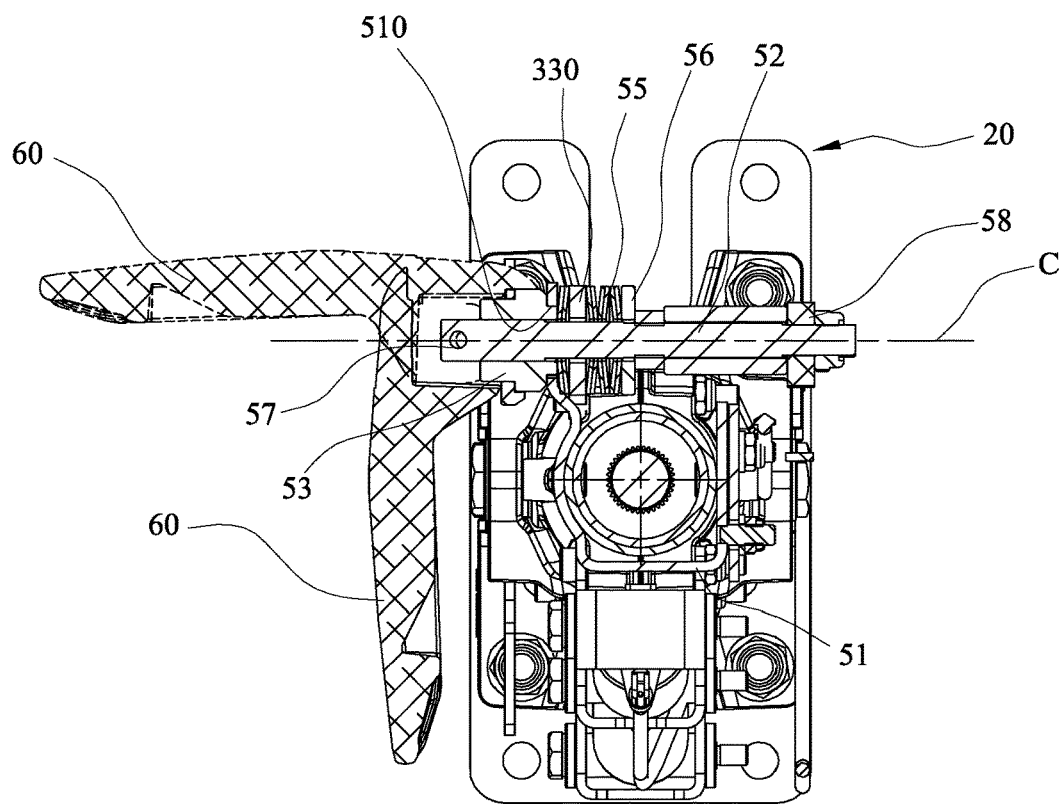
FIG. 6 is a sectional view taken along section line VI-VI of FIG. 4.

With particular reference to such figures, 10 globally indicates a steering column for vehicles, for example heavy-duty vehicles such as agricultural vehicles.

The steering column 10 includes a base 20 which can be fixed, for example, by means of threaded members, to the vehicle.

The base 20, for example, is substantially hollow and comprises a cylindrical inner cavity 21, for example of the type of a cylindrical sleeve. The base 20 may have different heights according to the needs. The base 20 comprises, for example, a cylindrical seat 22 transverse (for example perpendicular) to the axis of the cylindrical cavity 21.

For example, the cylindrical seat 22 is a through hole from side to side of the surface of base 20.

On the base 20, a first lug 23, for example protruding in a direction substantially radial outside of the same base, in a position in squareness with the cylindrical seat 22, is also formed.

The base 20 is constituted by a first pair of lower half shells, for example joined together by means of screws, which define the lower portion of the cylindrical cavity 21 and by two upper half shells, for example, joined to each other by means of screws, which define the upper portion of the cylindrical cavity 21.

Each of the upper half shells, moreover, defines a cylindrical seat 22 axially aligned to that of the upper half shell.

The steering column 10 also comprises a lower section 25, which is connected to the base 20 with respect to a single rotational degree of freedom.

The lower section 25 for example comprises a substantially cylindrical body, for example with variable section along the axis.

The lower section 25 is for example substantially hollow and has a substantially cylindrical internal cavity.

In particular, the lower section 25 is hinged, for example in correspondence of its lower end, to the base 20 with respect to a first axis of rotation A' perpendicular to the axis of the cylindrical cavity 21.

In particular, the lower section 25 supports a hinge pin 26, which is received in the cylindrical seat 22 of the base 20.

The hinge pin 26 allows at the same time the oscillation of the lower section 25 with respect to base 20 about the first axis of rotation A'.

The lower section 25 is adapted in practice to be oscillated relative to the base 20 alternately between an alignment configuration, in which the axis of the inner cavity 21 of the base 20 coincides with the central axis of the lower section 25, and a misalignment configuration, in which the axis of the inner cavity 21 of the base 20 coincides with the central axis of the lower section 25, for example by an acute angle, for example between −20° and +40° (indicating as positive the angles tilted towards the driver) with respect to the alignment configuration, preferably between 0° and 30° or between −15° and +30°, or otherwise configurable according to the requirements.

The lower section 25, for example, comprises a second lug 27, for example protruding in a direction substantially radial outside of the same intermediate section in a position in squareness with the hinge pin 26 (received into the cylindrical seat 22).

The second lug 27 is substantially superimposed on the first lug 23 along a plane orthogonal to the cylindrical seat 22 and passing through the axis of the inner cavity 21.

The lower section 25, for example at its lower end, comprises a first lower tubular section, which is constituted by a first pair of lower half shells, for example joined together by means of screws, which define the lower portion of the internal cylindrical cavity.

The lower section 25 may have different heights depending on necessity. The lower section 25 in correspondence to the upper end comprises, for example, a cylindrical seat 28 transverse (for example perpendicular) to the axis of the internal cylindrical cavity.

For example, the cylindrical seat 28 of the lower section 25 is a through seat from side to side of the surface of the lower section 25.

The cylindrical seat 28 of the lower section 25 has an axis parallel to the axis of the cylindrical seat 23 of the base 20.

On the lower section 25, for example at the upper end of the same, a third lug 29, for example protruding in a direction substantially radial outside of the same lower section, in a position in squareness with the cylindrical seat 28, is also formed.

The third lug 29 is substantially superimposed on the second lug 27 along a plane orthogonal to the cylindrical seat 28 passing through the axis of the inner cavity of the lower section 25.

The upper end of the lower section 25 includes a second upper tubular section constituted for example by a pair of upper half shells, for example joined together by means of screws, which define the upper portion of the internal cavity.

Each of the upper half shells, moreover, defines a respective portion of the cylindrical seat 28 axially aligned to that of the other upper half shell.

The upper half shells of the lower section 25 are, for example, completely identical to the upper half shells of the base 20.

Each of the upper half shells houses a respective portion of the cylindrical pin 26 axially aligned to that housed by the other upper half shell.

A coaxial tubular extension section may be provided between the first lower tubular section and the second upper tubular section of the lower section 25.

The steering column 10 also comprises an intermediate section 30, which is connected to the lower section 25 with respect to a single rotational degree of freedom.

The intermediate section 30 for example comprises a substantially cylindrical body, for example with variable section along the axis.

The intermediate section 30 is for example substantially hollow and has a substantially cylindrical internal cavity.

In particular, the intermediate section 30 is hinged, for example in correspondence of its lower end, to the lower section 25 with respect to a second axis of rotation A″ perpendicular to the axis of the inner cylindrical cavity.

In particular, the intermediate section 30 supports a hinge pin 31, which is received in the cylindrical seat 28 of the lower section 25.

The hinge pin 31 allows at the same time the oscillation of the intermediate section 30 with respect to the lower section 25 about the second axis of rotation A″.

The intermediate section 30 is adapted in practice to be oscillated relative to the lower section 25 alternately between an alignment configuration, in which the central axis of the inner cavity of the lower section 25 coincides with the central axis of the intermediate section 30, and a misalignment configuration, in which the axis of the inner cavity of the lower section 25 coincides with the central axis of the intermediate section 30, for example by an acute angle, for example between −20° and +60° (indicating as positive the angles tilted towards the driver) with respect to the alignment configuration, preferably between 0° and 55°, or otherwise configurable according to the requirements.

The intermediate section 30, for example, comprises a fourth lug 32, for example protruding in a direction substantially radial outside of the same intermediate section in a position in squareness with the hinge pin 31 (received into the cylindrical seat 28).

The fourth lug 32 is substantially superimposed on the third lug 29 of the lower section 25 along a plane orthogonal to the cylindrical seat 28 and passing through the axis of the inner cavity.

The lower portion of the intermediate section 30 can be made for example by a pair of lower half shells, for example joined together by means of screws, which define the lower portion of the internal cavity.

Moreover, each of the lower half shells houses a respective portion of the cylindrical pin 31 axially aligned to that housed in the other lower half shell. The lower half shells of the intermediate section 30 are, for example, completely identical to the lower half shells of the lower section 25.

The lower portion of the intermediate section 30 is prolonged axially by an upper tubular section which extends axially for a given axial section above the second axis of rotation A″.

The steering column 10 includes a first mutual rotation locking assembly between the lower section 25 and the base 20 relative to the first axis of rotation A′.

In particular, between the lower section 25 and the base 20, a first gas spring 40 (defining this first locking assembly) is interposed, which is configured to exert an elastic thrust between the lower section 25 and the base 20, for example directed towards the alignment configuration of the same.

The first gas spring 40' comprises a first cylinder 41' hinged to the base 20, for example in correspondence of the first lug 23.

Furthermore, the first gas spring 40' comprises a first stem 42' slidably inserted in the first cylinder 41' and hinged to the lower section 25, for example in correspondence of the second lug 27.

The first stem 42' supports a piston (not visible in the figures) placed inside the first cylinder 41' for the pneumatic actuation, by a fluid, for example a (compressible) gas, of the first stem 42' from a retracted configuration to an extracted configuration from the first cylinder 41'.

The first gas spring 40' comprises a first control element 43', for example placed in correspondence of the first stem 42', preferably at its distal end from the first cylinder 41', which is selectively operable between a stop position (raised), in which it stops the sliding of the first stem 42' in a determined axial position (interposed between the retracted configuration and the extracted configuration, included) with respect to the first cylinder 41', and an unlocked position (lowered), in which it releases the sliding of the first stem 42' relative to the first cylinder 41'.

The first control element 43' comprises for example a lever, for example of throttling type, rotatably coupled to the first stem 42' and operable in rotation by a predetermined angle for the transition from the stop position to the unlocked position.

The steering column 10 also includes a second mutual rotation locking assembly between the intermediate section 30 and the lower section 25 relative to the second axis of rotation A".

In particular, between the intermediate section 30 and the lower section 25, a second gas spring 40" (defining this locking assembly) is interposed, which is configured to exert an elastic thrust between the intermediate section 30 and the lower section 25, for example directed towards the alignment configuration of the same.

The second gas spring 40" comprises a second cylinder 41" hinged to the lower section 25, for example in correspondence of the third lug 29. Furthermore, the second gas spring 40" comprises a second stem 42" slidably inserted in the second cylinder 41" and hinged to the intermediate section 30, for example in correspondence of the fourth lug 32.

The second stem 42" supports a piston (not visible in the figures) placed inside the second cylinder 41" for the pneumatic actuation, by a fluid, for example a (compressible) gas, of the second stem 42" from a retracted configuration to an extracted configuration from the second cylinder 41". The second gas spring 40" comprises a second control element 43", for example placed in correspondence of the second stem 42", preferably at its distal end from the second cylinder 41", which is selectively operable between a stop position (raised), in which it stops the sliding of the second stem 42" in a determined axial position (interposed between the retracted configuration and the extracted configuration, included) with respect to the second cylinder 41", and an unlocked position (lowered), in which it releases the sliding of the second stem 42" relative to the second cylinder 41".

The second control element 43" comprises for example a lever, for example of throttling type, rotatably coupled to the second stem 42" and operable in rotation by a predetermined angle for the transition from the stop position to the unlocked position.

The intermediate section 30 also comprises a third lug 33, for example protruding in a direction substantially radial outside of the same intermediate section in a position in squareness with the hinge pin 31.

The third lug 33 includes an elongated body 330 in the axial direction with respect to the intermediate section 30 and extends in the opposite direction to the lower section 25 and the base 20 beyond the intermediate section 30 of a projecting section of given length, for example greater than the axial length of the intermediate section itself.

The third lug 33, for example in correspondence of the elongated body 330, includes an elongated through slot 331 with longitudinal axis parallel to the axis of the intermediate body 30.

The through slot 331 has for example a specific length substantially comprised between 10 mm and 110 mm, preferably equal to 80 mm or in any case partly sized according to the requirements.

The steering column 10 also comprises an upper section 50, which is connected to the intermediate section 30 (for example to the upper tubular section of the same), in a sliding manner with respect to a direction of sliding parallel to the axis of the intermediate section 30 itself.

The upper section 50 comprises for example a cylindrical body, for example, also hollow (provided with a cylindrical inner cavity), which is connected coaxially to the intermediate section 30.

The upper section 50 and the intermediate section 30, for example, define a telescopic connection, for example prismatic, defining an additional degree of freedom between the upper section 50 and the intermediate section 30 and, therefore, a translational degree of freedom, further compared to the rotational degree of freedom described above of the upper section 50 with respect to the base 20.

For example, the intermediate section 30 is inserted within the internal cavity of the upper section 50 (or vice versa).

The upper section 50 comprises a reversible frictional locking assembly, which is configured to block in a reversible manner the mutual sliding between the upper section 50 and the intermediate section 30.

For example, the frictional locking assembly comprises a support bracket 51, for example, projecting outside of the upper section 50 itself and fixed to it.

The support bracket 51 includes, for example, a through hole 510, for example facing at least a section of the through slot 331.

The support bracket 51 is adapted to support a drive pin 52, which has a longitudinal axis perpendicular to the axis of the upper section 50.

The drive pin 52 is for example slidably connected to the support bracket 51, for example inserted into the through hole 510.

The drive pin 52 is for example also inserted in the through slot 331 of the intermediate section 30, so as to slide axially along the same, between two end positions (upper and lower) defined by axially opposite walls of the through slot itself, during the sliding of the upper section 50 with respect to the intermediate section 30.

The drive pin 52 is axially divided ideally, so as to present a first end portion protruding from a part of the through hole 510 opposite with respect to the through slot 331, an intermediate portion interposed between the through hole 510 and the through slot 331 and a second end portion protruding from one side of the through slot 331 opposed to the through hole 510.

On the intermediate portion is fitted (slidably in the axial direction of the drive pin 52) a first friction member 54 of the frictional locking assembly, for example, one or more springs, such as cup springs.

The first friction member 54 is substantially axially interposed between the elongated body 330 (surrounding the through slot 331) and a section of the bracket 51 that surrounds the through hole 510.

On the second end portion is fitted (slidably in the axial direction of the drive pin 52) a second friction member 55 of the locking assembly, for example, one or more springs, such as cup springs.

The frictional locking assembly is equipped with a control member selectively operable between a closed position, in which it stops the sliding of the upper section 50 with respect to the intermediate section 30, and an open position, in which it releases the sliding of the upper section 50 relative to the intermediate section 30.

In particular, the control member includes a cylindrical sleeve 53 which is slidably associated with the drive pin 52, which is for example fitted on the first end section of the drive pin 52, with reduced radial clearance. The drive pin 52 is thus movable along an axial direction of sliding of the cylindrical sleeve 53 itself.

The cylindrical sleeve 53 in practice is fixed to the support bracket 51 in correspondence of the through hole 510 and extends axially and radially its dimensions so as to be able to support slidably the drive pin 52. Furthermore, the control member comprises a pressure body 56 substantially axially constrained to the drive pin 52, for example fitted on the second end portion; the pressure body comprises for example a disc-like body, which is adapted to press on the second friction member 55 which is then interposed between the pressure body 56 and the elongated body 330 (or the section thereof surrounding the through slot 331).

The pressure body 56 and the cylindrical sleeve 53 are operable towards and away from each other, as will be better described in the following, for the closing, respectively (compression) and opening (release) the first friction member 54 and the second friction member 55.

When the first friction member 54 and the second friction member 55 are in the closed position the sliding of the upper section 50 with respect to the intermediate section 30 it is arrested by friction between the first friction member 54 and the elongated body 330 and between the second friction member 55 and the elongated body 330.

When the first friction member 54 and the second friction member 55 are in the open position, the sliding of the upper section 50 with respect to the intermediate section 30 is allowed by a drop of a predetermined, settable friction value between the first friction member 54 and the elongated body 330 and between the second friction member 55 and the elongated body 330.

When the first friction member 54 and the second friction member 55 are in the open position, the friction between the first friction member 54 and the elongated body 330 and between the second friction member 55 and the elongated body 330 may be substantially not null, i.e. may be determined in such a way as to prevent the spontaneous sliding of the upper body 50 with respect to the intermediate body 30.

In practice, the mutual distance between the pressure body 56 and the cylindrical sleeve 53 in the open position is dimensioned in such a way that, in this open position, the friction between the first friction member 54 and the elongated body 330 and between the second friction member 55 and the elongated body 330 is substantially not null, i.e. is determined in such a way as to prevent the spontaneous sliding of the upper body 50 relative to the intermediate body 30.

The drive pin 52, in correspondence of its first section protruding from the cylindrical sleeve 53, comprises a further pin 57, for example, in squareness with respect to the longitudinal axis of the drive pin 52 (parallel to the longitudinal axis of the upper section 50).

The steering column 10 includes an actuation lever 60 connected to the upper section 30 which is operable between a locked position, in which the actuation lever is in stable equilibrium and binds both degrees of freedom of the upper section 50 relative to the base 20, in particular the degree of translational freedom between the upper section 50 and the intermediate section 30 and the rotational degree of freedom between the intermediate section 30 and the base 20, and two distinct unlocked positions, in each of which it releases respectively one of the two degrees of freedom of the upper section 50 relative to the base 20.

The actuation lever 60 is for example arranged to operate on the drive pin 52, as will be better described in the following.

In particular, the actuation lever 60 is hinged to the drive pin 52 with respect to a first axis of oscillation B orthogonal to the longitudinal (revolution) axis of the drive pin 52.

For example, the actuation lever 60 is hinged to the drive pin 52 by means of the additional pin 57.

The actuation lever 60 comprises, at the end connected to the drive pin 52, a cam 61 provided with an eccentric profile relative to the first axis of oscillation B.

The cam 61, for example, has an enlarged area located at a certain angle, for example substantially at right angles, with respect to the first axis of oscillation B from a substantially tapered area.

The cam 61 is designed to come into contact selectively, with its enlarged area or its tapered area, with the cylindrical sleeve 53 (i.e. its distal face from the first friction member 54), during an oscillation of a given angle (equal to the angle that separates the tapered region from the enlarged area of the cam 61) of the actuation lever 60 with respect to the first axis of oscillation B.

Advantageously, the actuation lever 60 is connected to the control member (for example to the cylindrical sleeve 53 and the pressure body 56) for the actuation in mutual sliding between the cylindrical sleeve 53 and the pressure body 56, selectively between the closed position and the open position, respectively in the locked position of the actuation lever 60, in which the enlarged area of the cam 61 contacts the cylindrical sleeve 53 and presses it by pulling a result of the pressure body 56 in the approach to the cylindrical sleeve 53 (in the closed position of the control mechanism), and in a unlocked translation position of the actuation lever 60, in which (having rotated with respect to the first axis of oscillation B) the tapered region of the cam 61 comes into contact with the cylindrical sleeve 53 and leaves the pressure body 56 free to slide, for effect of the elastic force of the first friction member 54 and the second friction member 55, away from the cylindrical sleeve 53 (in the open position of the control member).

The tapered area of the cam 61 has a profile substantially complementary to the profile of the section of the cylindrical sleeve 53 with which it comes into contact, for example substantially planar, so that the actuation lever 60, in its unlocked translation position, is in a position of stable equilibrium, i.e. remains securely in that position if unstressed.

The spontaneous movement of the actuation lever 60 in this unlocked translation position is also prevented by the residual friction between the first friction member 54 and the elongated body 330 and between the second friction member 55 and the elongated body 330 in the open position.

In practice, by operating the actuation lever 60 from the locked position to the unlocked translation position (making it oscillate with respect to the first axis of oscillation B of the predetermined angle) moves from the closed position to the open position of the frictional locking assembly and, then, the degree of translational freedom of the upper section 50 with respect to base 20 is released.

The drive pin 52 (and/or the actuation lever 60) includes an eccentric section 58 (eccentric with respect to the longitudinal central axis of the drive pin 52 itself), which for example is defined by a small lever keyed on the drive pin 52 and protruding radially therefrom, for example in a radial direction.

The eccentric section 58 is for example fixed (axially and in rotation) to the second end section of the drive pin 52, for example on the outside of the pressure body 56.

Figure 7:
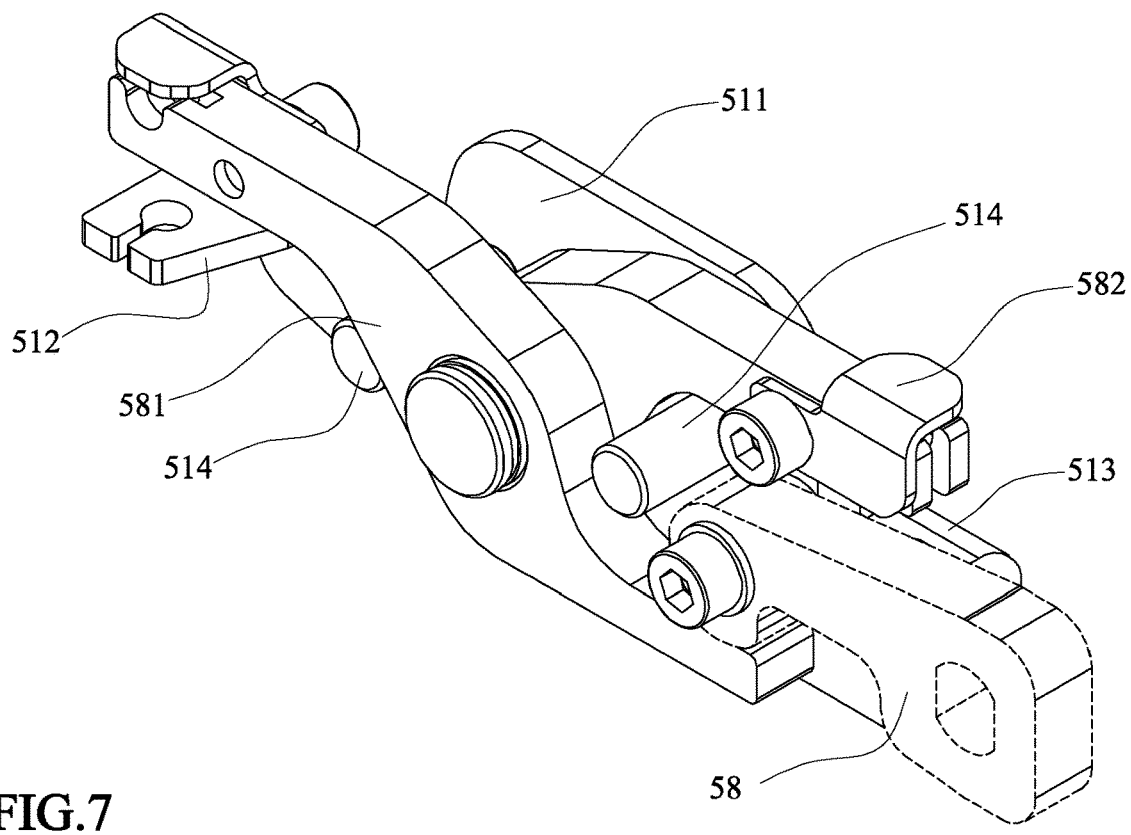
FIG. 7 is an axonometric view of a detail of the steering column according to the invention.
Figure 8:
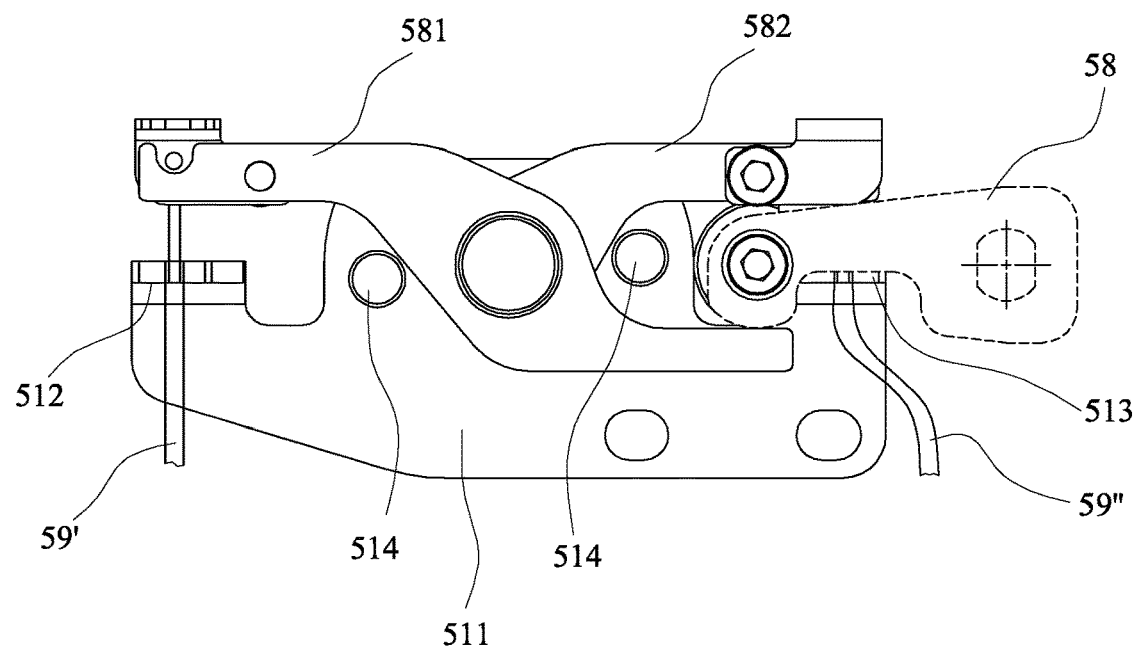
FIG. 8 is a side view of FIG. 7 in a rest position.
Figure 9:
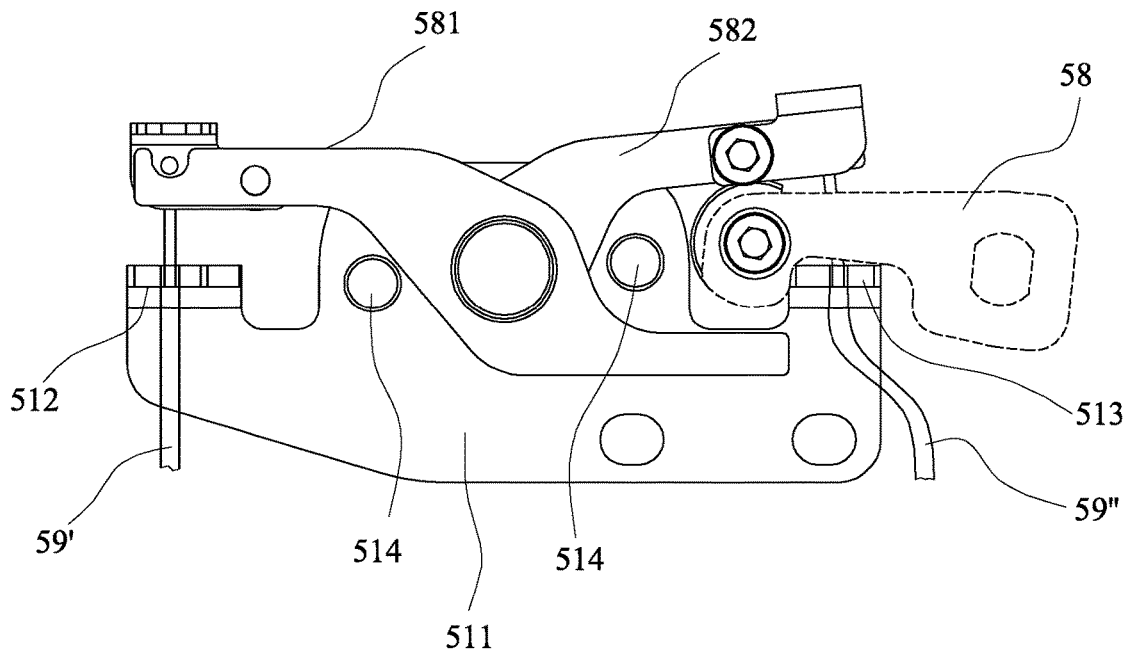
FIG. 9 is a side view of FIG. 7 in a first operating position.
Figure 10:
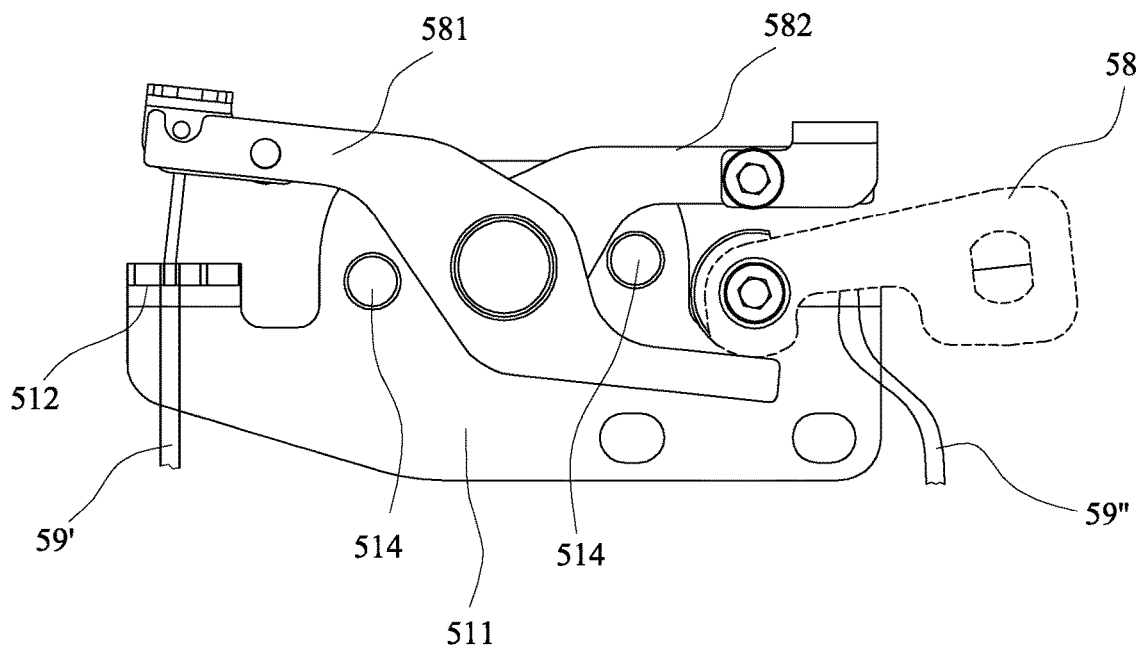
FIG. 10 is a side view of FIG. 7 in a second operating position.
Figure 11:
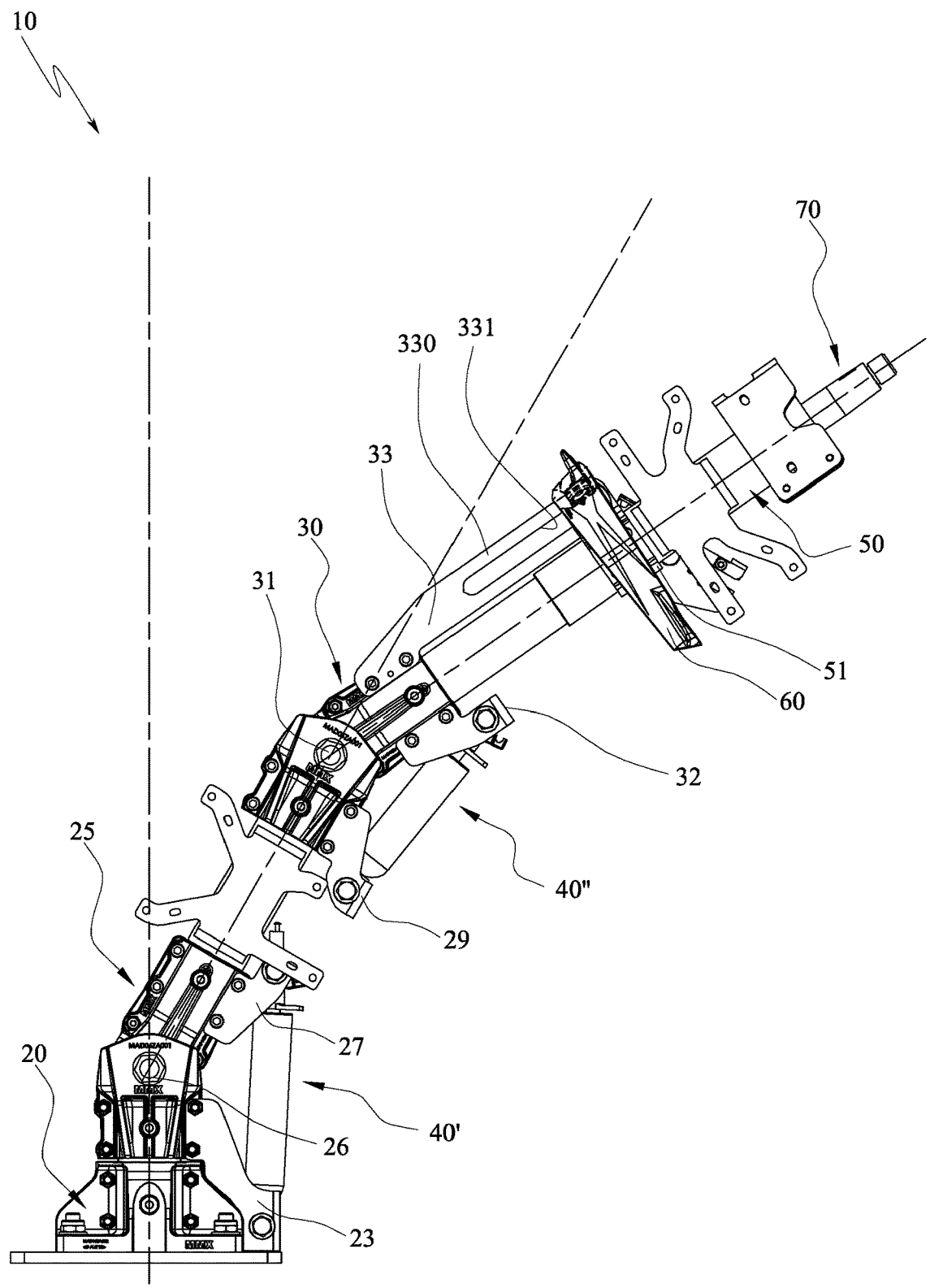
FIG. 11 is a side view of the steering column in a tilted configuration with respect to both articulations and extended.
Figure 12:
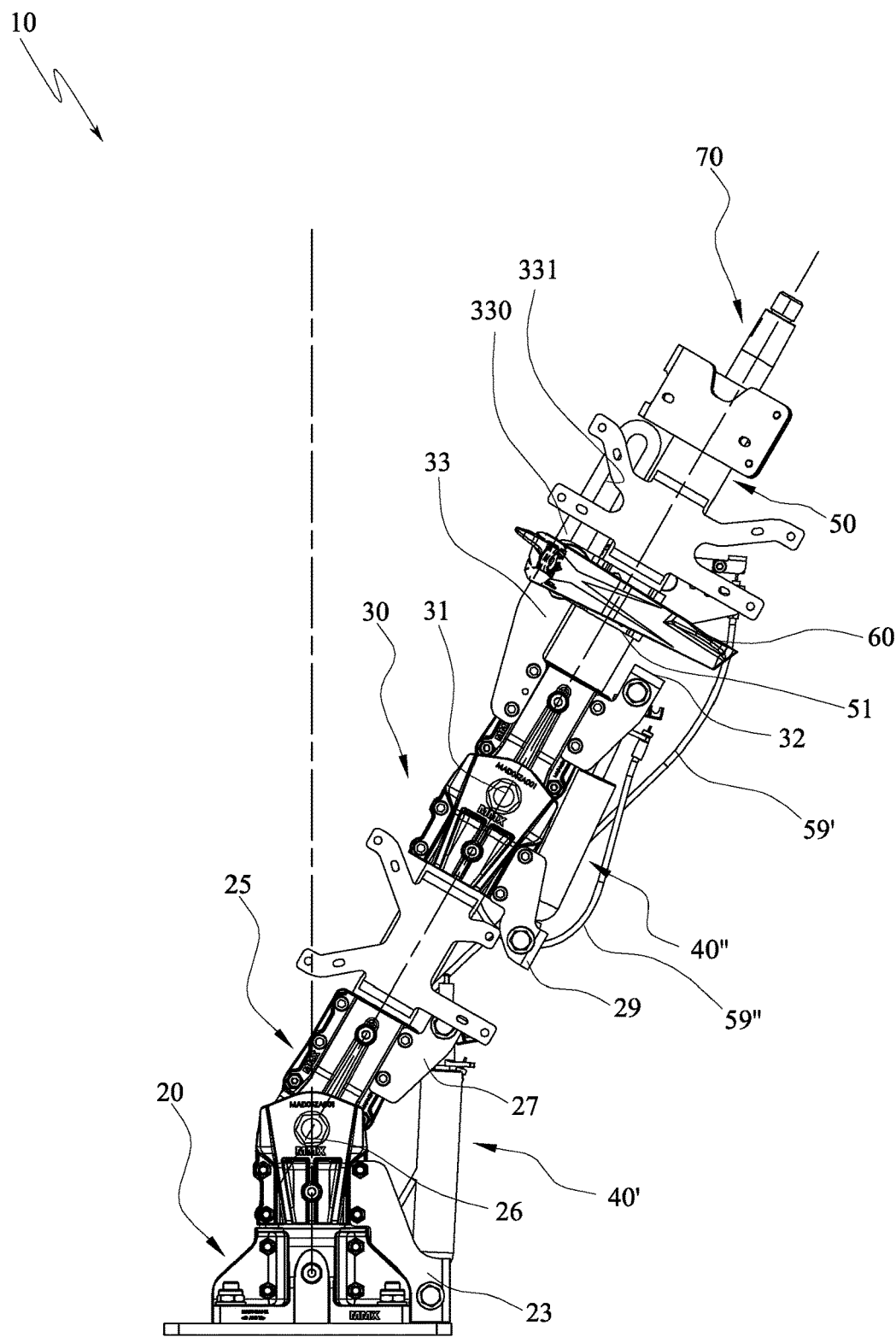
FIG. 12 is a side view of the steering column in a tilted configuration with respect to a first articulation and extended.
Figure 13:
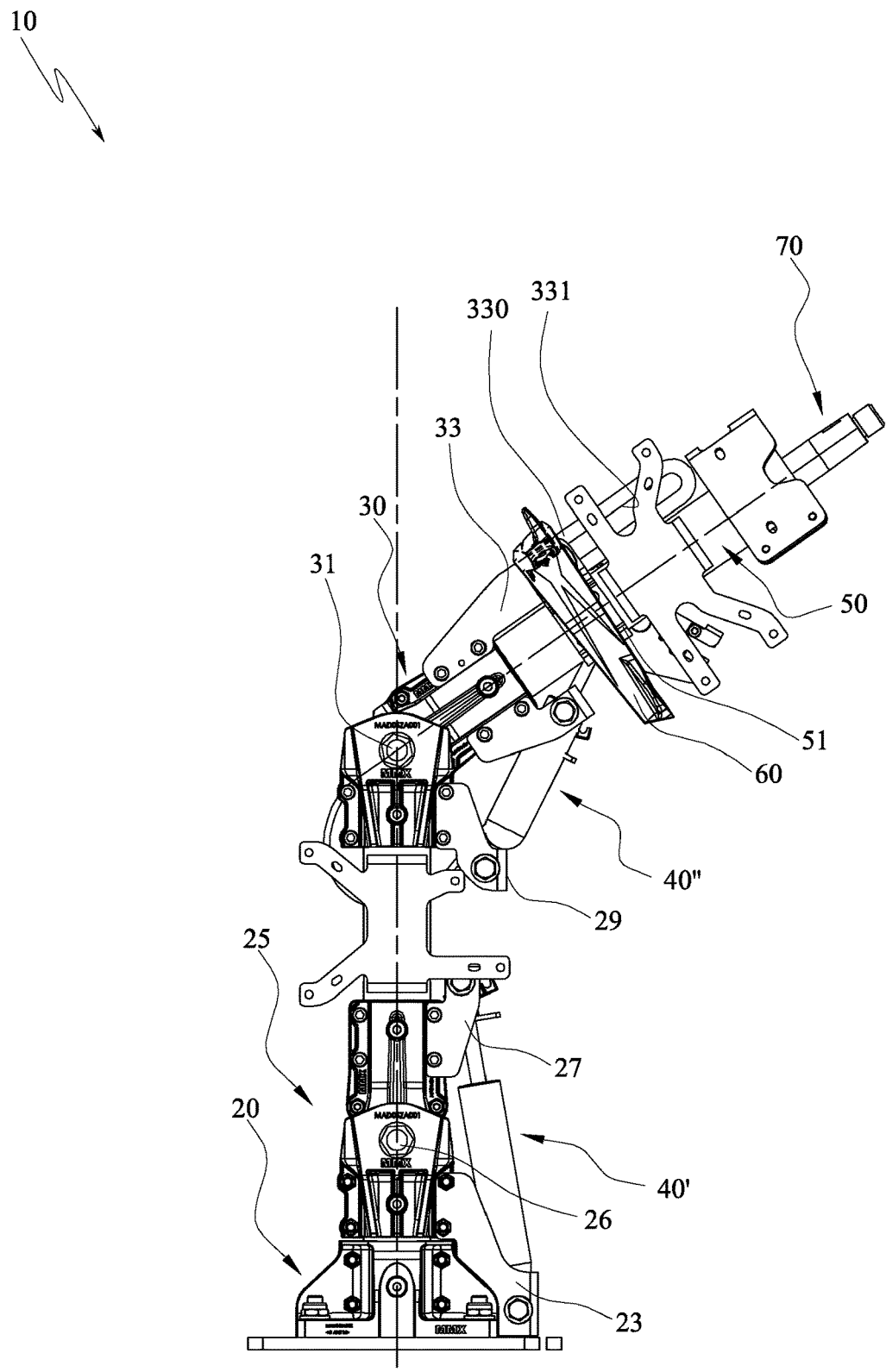
FIG. 13 is a side view of the steering column in a tilted configuration with respect to a second articulation and collapsed.
Figure 14:
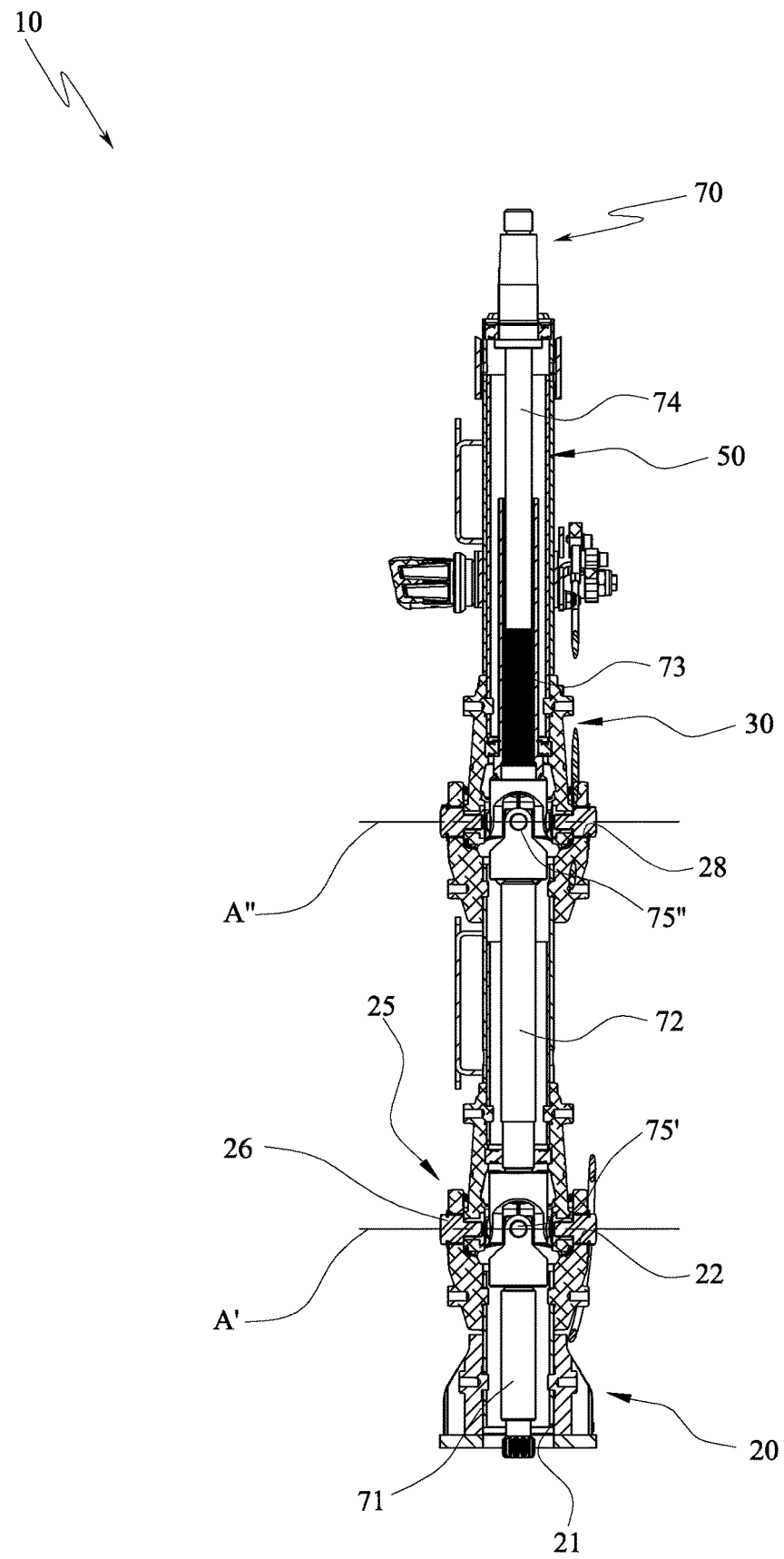
FIG. 14 is a sectional view taken along line XIV-XIV of FIG. 2.

The eccentric portion 58 is, for example, flanked (at a distance) to a flap 511 of the support bracket 51 (see FIGS. 7-10) or anyway integral with it (or to the upper portion 50).

The actuation lever 60, being connected through the further pin 57, to the drive pin 52, is rotatably connected to the upper section 50 with respect to a second axis of oscillation C coinciding with the longitudinal central axis of the drive pin 52, which can rotate within the through hole 510.

A swinging of the actuation lever 60 and, thus, of the eccentric section 58, with respect to the second axis of oscillation C (in a direction of rotation or the other) is such as to selectively rotate the eccentric section 58 relative to the flap 511.

The flap 511 is associated in a rotatable manner, relative to an axis of oscillation parallel to the second axis C of oscillation of the actuation lever 60 or of the eccentric portion 58, to a first transmission lever 581.

The first transmission lever 581 is hinged to the flap 511, for example, in correspondence of its central portion, so that the lowering of one of its ends corresponds to a raising of the opposite end and vice versa.

The flap 511 is associated in a rotatable manner, relative to an axis of oscillation parallel to the second axis C of oscillation of the actuation lever 60 or of the eccentric portion 58, to a second transmission lever 582.

The axes of oscillation of the first transmission lever 581 and the second transmission lever 582, for example, are coincident.

The free end of the eccentric portion 58 is adapted to be interposed, substantially in contact, with an eccentric portion of both the first transmission lever 581 and the second transmission lever 582.

The second transmission lever 581 is hinged to the flap 511, for example, in correspondence with one of its ends, the distal end from its axis of oscillation (and proximal to the eccentric portion 58) is placed substantially above the eccentric portion 58.

One of the ends of the first transmission lever 581 (the one proximal to the eccentric portion 58) is substantially positioned at the bottom of the eccentric portion 58.

The flap 511 includes a first shelf 512 provided with a first through slot, for example, open laterally, which is positioned at the bottom end (distal from the eccentric portion 58) of the first transmission lever 581.

Such end (distal from the eccentric portion 58) of the first transmission lever 581 comprises a respective through slot, for example, open laterally, superimposed on that of the first shelf 512.

The flap 511 includes a second shelf 513 provided with a first through slot, for example, open laterally, which is positioned below the (proximal to the eccentric portion 58) of the second transmission lever 582.

Such end (proximal to the eccentric portion 58) of the second transmission lever 582 comprises a respective through slot, for example, open laterally, superimposed on that of the second shelf 513.

The first transmission lever 581 and the second transmission lever 582 are pushed into forced contact respectively with an end of stroke element 514 secured to the flap 511 for example by means of a respective elastic member, for example a spring (not visible).

The end of stroke element is such as to interrupt the approaching travel of the end of the respective transmission lever 581 and 582 to the respective shelf 512 and 513.

In practice, the rotation of the eccentric portion 58 in a first direction of rotation, for example clockwise, is such as to actuate the first transmission lever 581 in oscillation (in contrast to the action of the spring) and move the end of the first transmission lever 581 provided with the through slot away from the respective first shelf 512.

A rotation of the eccentric portion 58 in a second (and opposite) direction of rotation, for example counterclockwise, is such as to actuate the second transmission lever 582 in oscillation (in contrast with the action of the spring) and move the end of the second transmission lever 582 provided with the through slot away from the respective second shelf 513.

The first transmission lever 581, i.e. the eccentric portion 58, is connected via a first traction cable 59', for example a sheathed cable of the Bowden type, to the first control element 43' of the first gas spring 40' for the actuation of the same first control element 43' selectively between its stop position and its unlocked position, as a result of an oscillation of the eccentric section 58 and thus of the first transmission lever 581 compared to the second axis of oscillation C, in the first direction of rotation, of a given set angle of oscillation.

In particular, the sheath of the first traction cable 59' is fixed at opposite ends, respectively to the first shelf 512 (in correspondence of the through slot opened in the same sideways) and to a fixed bracket associated below the first control element 43' of the first gas spring 40' and the cable of the first sheathed traction cable 59' is fixed at opposite ends, respectively, to the ends of the first transmission lever 581 (in correspondence of the through slot, opened sideways thereof) and to the first control element 43' of the first gas spring 40.

The second transmission lever 582, i.e. the eccentric section 58 is connected via a second traction cable 59", for example a sheathed cable of the Bowden type, to the second control element 43" of the second gas spring 40" for the actuation of the same second control element 43" selectively between its stop position and its unlocked position, as a result of an oscillation of the eccentric section 58 and thus of the second transmission lever 582 compared to the second axis of oscillation C, in the second direction of rotation, of a given set angle of oscillation.

In particular, the sheath of the second sheathed traction cable 59" is fixed at opposite ends, respectively to the second shelf 513 (in correspondence of the through slot opened in the same sideways) and to a fixed bracket associated to the below of the second control element 43" of the second gas spring 40" and the cable of the second sheathed traction cable 59" is fixed at opposite ends, respectively, to the ends of the second transmission lever 582 (in correspondence with the through slot open sideways thereof) and to the second control element 43" of the second gas spring 40".

The unlocking of the constraint to the rotation of the lower section 25 with respect to the base 20 about the first axis of rotation A' can be realized as follows.

A rotation of the actuation lever 60 relative to the second axis of oscillation C in the first direction of rotation between the locked position and a first unlocked position (of the rotation), in which it is rotated by an angle (for example, acute), for example downwards, causes a mutual spacing between the end of the first transmission lever 581 (provided with the through slot) relative to the first shelf 512.

In particular, the cable of the first sheathed traction cable 59' is placed in tension and the first control member 43' of the first gas spring 40' is brought from the stop position to the unlocked position, unlocking the first gas spring 40' which will thus allow the adjustment of tilting, relative to the first axis of rotation A', of the lower section 25 (and therefore the upper section 50) relative to the base 20 against or according to the action of the first control spring 40'.

The actuation lever 60, in its first unlocked position, is in a position of stable equilibrium, i.e. remains securely in that position if unstressed.

In practice, the spontaneous rotation of the actuation lever 60 in that first unlocked position is prevented by the friction between the first friction member 54 and the elongated body 330 and between the second friction member 55 and the elongated body 330, both when they are in closed position and when they are in open position.

In fact, by operating the actuation lever 60 from the locked position to the first unlocked position (making it oscillate with respect to the second axis of oscillation C in the first direction of rotation of the predetermined angle) moves from the stop position to the unlocked position of the first control element 43' of the first gas spring 40' and, therefore, the rotational degree of freedom of the lower section 25 with respect to base 20 is released.

The block of the constraint to the oscillation of the lower section 25 (i.e. the upper segment 50) with respect to the base 20 about the first axis of rotation A' can be achieved by actuating the reverse rotation of the actuation lever 60 relative to the second axis of oscillation C from the first unlocked position to the locked position, causing a mutual approach between the end of the first transmission lever 581 (provided with the through slot) with respect to the first shelf 512 and, therefore, the release of the first control element 43' of the first gas spring 40'.

The unlocking of the constraint to the rotation of the intermediate section 30 with respect to the lower section 25 about the second axis of rotation A" can be realized as follows.

A rotation of the actuation lever 60 relative to the second axis of oscillation C in the second direction of rotation between the locked position and a second unlocked position, in which it is rotated by an angle (for example, acute), for example upwards, causes a mutual spacing between the end of the second transmission lever 582 (provided with the through slot) relative to the second shelf 513.

In particular, the cable of the second sheathed traction cable 59" is placed in tension and the second control member 43" of the second gas spring 40" is brought from the stop position to the unlocked position, unlocking the second drive spring 40" which will thus allow the adjustment of tilting, relative to the second axis of rotation A", of the intermediate section 30 (and therefore the upper section 50) relative to the lower section 25 against or according to the action of the second gas spring 40".

The actuation lever 60, in its second unlocked position, is in a position of stable equilibrium, i.e. remains securely in that position if unstressed.

In practice, the spontaneous rotation of the actuation lever 60 in that second unlocked position is prevented by the friction between the first friction member 54 and the elongated body 330 and between the second friction member 55 and the elongated body 330, both when they are in closed position and when they are in open position.

In fact, by operating the actuation lever 60 from the locked position to the second unlocked position (making it oscillate with respect to the second axis of oscillation C in the second direction of rotation of the predetermined angle) moves from the stop position to the unlocked position of the second control element 43" of the second gas spring 40" and, therefore, the rotational degree of freedom of the intermediate section 30 with respect to the lower section 25 is released.

The block of the constraint to the oscillation of the intermediate section 30 (or the upper section 50) with respect to the lower section 25 about the second axis of rotation A" can be achieved by actuating the reverse rotation of the actuation lever 60 relative to the second axis of oscillation C from the second unlocked position to the locked position, causing a mutual approach between the end of the second transmission lever 582 (provided with the through slot) with respect to the second shelf 513 and, therefore, the release of the second control element 43" of the second gas spring 40".

For example, the actuation lever 60 may include a first surface (flat), for example in correspondence with its distal end from the first axis of oscillation B, substantially parallel to the same first axis of oscillation.

This first surface is adapted to be contacted by a driver of the vehicle for actuating the oscillation of the actuation lever 60 with respect to the first axis of oscillation B between the locked position and the first unlocked position of the translation.

For example, the actuation lever 60 may include a second surface (flat), for example at a distal end thereof from the second axis of oscillation C, substantially parallel to the second axis of oscillation C itself.

This second surface is adapted to be contacted by a driver of the vehicle for actuating the oscillation of the actuation lever 60 with respect to the second axis of oscillation C between the locked position and the first and/or second unlocked position.

The steering column 10 also includes a steering axis 70, which is contained within the upper section 50, the intermediate section 30, the lower section 25 and the base 20, for example inserted loosely inside the respective internal cavities and supported in rotation with respect to them by suitable rolling members, such as bearings, for example radial (ball) bearings.

In particular, the steering axis 70 comprises a base axis 71, which is inserted (axially locked) coaxially inside the internal cavity of the base 20 and is rotatable with respect to an axis of rotation coaxial to it (axially locked). A lower end (for example projecting downwards from the base 20) of the base axis 71, for example grooved, can be connected to a motion transmission group to a steering axle of the vehicle, preferably a hydrostatic steering assembly (hydrostatic power steering).

The steering axis 70 then comprises a lower axis 72, which is inserted (locked axially) coaxially within the internal cavity of the lower section 25 and is rotatable with respect to an axis of rotation coaxial to it.

The lower axis 72 and the base axis 71 are mutually connected by a first joint 75', for example a universal joint, which allows the transfer of rotary motion from the lower axis 72 to the base axis 71 also as a result of a tilting of the lower section 25 with respect to the base 20 about the first axis of rotation A'.

The steering axis 70 further comprises an intermediate axis 73, which is inserted (locked axially) coaxially within the internal cavity of the intermediate section 30 and is rotatable relative to an axis of rotation coaxial to it.

The intermediate axis 73 and the lower axis 72 are mutually connected by a second joint 75", for example a universal joint, which allows the transfer of rotary motion from the intermediate axis 73 to the lower axis 71 also as a result of a tilting of the intermediate section 30 with respect to the lower section 25 about the second axis of rotation A".

The steering axis 70 then comprises an upper axis 74, which is inserted (locked axially) coaxially within the internal cavity of the upper section 50 and is rotatable with respect to an axis of rotation coaxial to it.

The upper axis 74 is slidingly connected, for example in a telescopic manner, to the intermediate axis 73, for example dragged in sliding by the sliding of the upper section 50 with respect to the intermediate section 30. An upper end (for example protruding upwards from the upper section 50) of the upper axis 74 is connectable, for example rigidly, to a steering wheel, to drive in rotation the steering axis 70 with respect to the upper section 50, the intermediate section 30, the lower section 25 and the base 20 for steering the vehicle.

The invention thus conceived is susceptible to numerous modifications and variations, all falling within the inventive concept.

Further, all the details can be replaced by other technically equivalent elements.

In practice, the materials employed, as well as the shapes and the dimensions, may be any according to requirements without thereby abandoning the scope of protection of the following claims.

The invention claimed is:

1. A steering column (10), comprising:
a base (20);
a lower section (25), hinged to the base (20);
an intermediate section (30), hinged to the lower section (25);
an actuation lever (60) operable between a locked position, in which the actuation lever (60) is in stable equilibrium and constrains the mutual rotation of the lower section (25) relative to the base (20) and the mutual rotation of the intermediate section (30) relative to the lower section (25), and a first unlocked position or a second unlocked position, distinct from each other, in each of which it respectively releases one of the mutual rotation of the lower section (25) relative to the base (20) and the mutual rotation of the intermediate section (30) relative to the lower section (25);
wherein, in the first unlocked position and in the second unlocked position, the actuation lever (60) can be positioned in two distinct respective stable equilibrium positions.

2. Steering column (10) according to claim 1, comprising an upper section (50) slidably connected to the intermediate section (30).

3. Steering column (10) according to claim 2, wherein the actuation lever (60) to the locked position can be adapted to block the mutual translational motion between the upper section (50) and the intermediate section (30) and be operable between the locked position and a further unlocked position, distinct from the first unlocked position and the second unlocked position, in which it frees the mutual translational motion of the upper section (50) with respect to the intermediate section (30).

4. Steering column (10) according to claim 3, wherein, in the further unlocked position, the actuation lever (60) is positioned in a stable equilibrium position.

5. Steering column (10) according to claim 3, wherein between the upper section (50) and the intermediate section (30) a frictional locking assembly (54, 55) is interposed, equipped with a control member (53, 56) selectively operable between a closed position, in which it stops the sliding of the upper section (50) with respect to the intermediate section (30), and an open position, in which it releases the sliding of the upper section (50) relative to the intermediate section (30);
and wherein the actuation lever (60) can be connected to the control member (53, 56) for the actuation of the same selectively between the closed position and the open position, respectively in the locked position of the actuation lever (60) and in the further unlocked position of the same.

6. Steering column (10) according to claim 5, wherein the actuation lever (60) is rotatably connected to the upper section (50) with respect to a first axis of oscillation (B) and comprise a cam (61) with an eccentric profile relative to the first axis of oscillation (B) and adapted to actuate the control member (53, 56) selectively between the closed position and the open position as a result of an oscillation of the cam (61) with respect to the first axis of oscillation (B) of a given angle of oscillation.

7. Steering column (10) according to claim 1, wherein a first gas spring (40') is interposed between the lower section (25) and the base (20), comprising:
a first cylinder (41') hinged to the base (20) or to the lower section (25);
a first stem (42') slidably connected to the cylinder (41') and hinged to the lower section (25) or to the base (20); and
a first control element (43') selectively operable between a stop position, in which it stops the sliding of the first stem (42') relative to the first cylinder (41'), and an unlocked position, in which it releases the sliding of the first stem (42') relative to the first cylinder (41');
and wherein the actuation lever (60) is connected to the first control element (43') for the selective actuation of the same between the stop position and the unlocked position, respectively in the locked position of the actuation lever (60) and in a second position of the two unlocked positions of the same.

8. Steering column (10) according to claim 7, wherein the actuation lever (60) is rotatably connected to the upper section (50) with respect to a second axis of oscillation (C) and comprises at least an eccentric section (58) eccentric with respect to the second axis of oscillation to which the first control element (43') is connected by a first traction cable (59'), for the actuation of the first control element (43) selectively between the stop position and the unlocked position as a result of an oscillation of the eccentric section (58) with respect to the second axis of oscillation (C) of a given angle of oscillation.

9. Steering column (10) according to claim 7, wherein a second gas spring (40") is interposed between the intermediate section (30) and the lower section (25), comprising:
a second cylinder (41") hinged to the lower section (25) or to the intermediate section (30);
a second stem (42") slidably connected to the second cylinder (41") and hinged to the intermediate section (30) or to the lower section (25); and
a second control element (43") selectively operable between a stop position, in which it stops the sliding motion of the second stem (42") relative to the second cylinder (41"), and an unlocked position, in which it releases the sliding of the second stem (42") relative to the second cylinder (41");
and wherein the actuation lever (60) can be connected to the second control element (43") for the selective actuation of the same between the stop position and the unlocked position, respectively in the locked position of the actuation lever (60) and in a second unlocked position of the same.

10. Steering column (10) according to claim 9, wherein the actuation lever (60) may be rotatably connected to the upper section (50) with respect to a second axis of oscillation (C) and comprises at least an eccentric section (58) eccentric with respect to the second axis of oscillation (C) to which the second control element (43") is connected by a second traction cable (59"), for the actuation of the second control element (43") selectively between the stop position and the unlocked position as a result of an oscillation of the eccentric section (58) with respect to the second axis of oscillation (C) of a given angle of oscillation.

* * * * *